US006880816B1

(12) United States Patent
Wheeler et al.

(10) Patent No.: US 6,880,816 B1
(45) **Date of Patent: *Apr. 19, 2005**

(54) STRUCTURE FOR ISOLATING MOUNTING AND CLAMPING FORCES OF A POWER CLAMP

(75) Inventors: Timothy Wheeler, Shelby Township, MI (US); Jeffrey Dellach, Macomb, MI (US); Wayne Morroney, Troy, MI (US)

(73) Assignee: Norgren Automotive, Inc., Mount Clemens, MI (US)

( * ) Notice: Subject to any disclaimer, the term of this patent is extended or adjusted under 35 U.S.C. 154(b) by 257 days.

This patent is subject to a terminal disclaimer.

(21) Appl. No.: 09/916,567

(22) Filed: Jul. 27, 2001

Related U.S. Application Data

(60) Provisional application No. 60/225,974, filed on Aug. 17, 2000, provisional application No. 60/238,902, filed on Oct. 10, 2000.

(51) Int. Cl.[7] .................................................. B23Q 3/08

(52) U.S. Cl. ........................................................ 269/32

(58) Field of Search .............................. 269/32, 24, 27, 269/228, 201, 285, 286, 225, 236

(56) References Cited

U.S. PATENT DOCUMENTS

| | | | | |
|---|---|---|---|---|
| 3,381,954 | A | 5/1968 | Blatt | 269/32 |
| 4,494,739 | A | 1/1985 | Valentine | 269/32 |
| 5,351,584 | A | 10/1994 | Warheit | 81/407 |
| 5,575,462 | A | 11/1996 | Blatt | 269/32 |
| 5,829,112 | A * | 11/1998 | Blatt | 269/32 |
| 5,996,984 | A * | 12/1999 | Takahashi | 269/32 |
| 2002/0195761 | A1 * | 12/2002 | Dellach et al. | 269/32 |

* cited by examiner

*Primary Examiner*—Lee D. Wilson
(74) *Attorney, Agent, or Firm*—Young & Basile, P.C.

(57) ABSTRACT

An apparatus for absorbing the mounting and clamping forces of a linkage assembly of a power clamp. An enclosed bilateral housing of a power clamp is provided, wherein a linear actuator is connected to the housing and provides a piston rod extending into the housing. A linkage assembly is connected to the piston rod and disposed within the housing for converting the linear motion of the piston rod into rotary motion of a clamp arm. A high strength plate and beam structure is disposed within the housing and connected to the linkage assembly for absorbing the mounting and clamping forces generated by the linkage assembly. By absorbing the mounting and clamping forces of the linkage assembly, the high strength plate and beam structure allows the housing to be fabricated from a lightweight, inexpensive material.

20 Claims, 6 Drawing Sheets

STRUCTURE FOR ISOLATING MOUNTING AND CLAMPING FORCES OF A POWER CLAMP

CROSS-REFERENCE TO RELATED APPLICATION

This application claims the benefit of the filing dates of U.S. Provisional Patent Application Ser. No. 60/225,974, filed Aug. 17, 2000, and U.S. Provisional Patent Application Ser. No. 60/238,902, filed Oct. 10, 2000.

FIELD OF THE INVENTION

The field of the invention relates to power clamps, and more particularly, to an apparatus and method for absorbing the excessive clamping forces produced by the power clamp.

BACKGROUND OF THE INVENTION

Power clamps are known of the type in which linear actuating reciprocating movement of a fluid motor is adapted to be translated into rotary movement of a clamp arm. The clamp arm is attached to a linkage assembly or other force transmitting means which in turn is connected to the end of a piston rod of the fluid motor. In the retracted position of the fluid motor, the clamp arm is normally in a released position, that is, the clamp arm is removed from a work supporting surface. When the fluid motor is actuated, the clamp arm is pivotally moved into a clamping position to clamp the work piece to a work supporting surface and securely hold the workpiece thereto.

It is well known for such power clamps to have an open body axially aligned with and connected to the fluid motor. The open body can be mounted on a first support, wherein the body is opened at the top, bottom, and front, with a pair of opposed, spaced side plates having one end turned out and secured to the fluid motor. The open design of the body allows entry of dirt and/or other foreign matter into the interior of the body which can create problems with the internal working mechanisms of the power-operated clamp.

Other designs have remedied this problem by providing an enclosed power-operated clamp that seals against particle intrusion and protects the internal mechanisms of the power clamp from undue wear and malfunction caused by abrasive particles and other adverse elements. Such enclosed power clamps typically use a pivoted clamp arm actuated by an internal linkage that is completely enclosed within the housing so that only a rotary shaft passing through a protective bushing extends between the enclosed linkage and an exposed exterior clamp arm.

Enclosed power clamps typically have housings fabricated from a high strength metal such as steel or steel alloys. Due to the nature of these materials, as well as the tolerances and the enclosed configurations required of an enclosed power clamp housing, enclosed power clamps are rather difficult and expensive to manufacture, especially power clamp housings. In addition, these metals tend to be relatively heavy, thereby creating extra loads on the manipulators on which the housings are attached.

Other designs have attempted to resolve the shortcomings of the enclosed power clamp by providing a housing that is fabricated from a plurality of stacked planar plates. These types of designs still have the disadvantage of having all of the planar plates fabricated from a high strength steel. In addition, such designs have the design and manufacturing concerns of having to stack and connect a plurality of planar plates to create a power clamp.

Thus, it would be desirable to provide an inexpensive and lightweight rotary clamp housing that provided the structural integrity required of a power clamp.

SUMMARY OF THE INVENTION

The present invention overcomes the above-noted shortcomings by providing an apparatus and method for absorbing the mounting and clamping forces of a power clamp. The present invention provides a power clamp having an enclosed bilateral housing. A linear actuator is connected to the housing and provides a piston rod extending into the housing. A linkage assembly is connected to the piston rod and disposed within the housing for converting linear motion of the piston rod into rotary motion of a clamp arm. The apparatus for absorbing excessive forces can be a plate and beam structure or a laminated plate structure, either structure can be disposed within the housing and connected to the linkage assembly for supporting the mounting and clamping forces realized by the linkage assembly.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
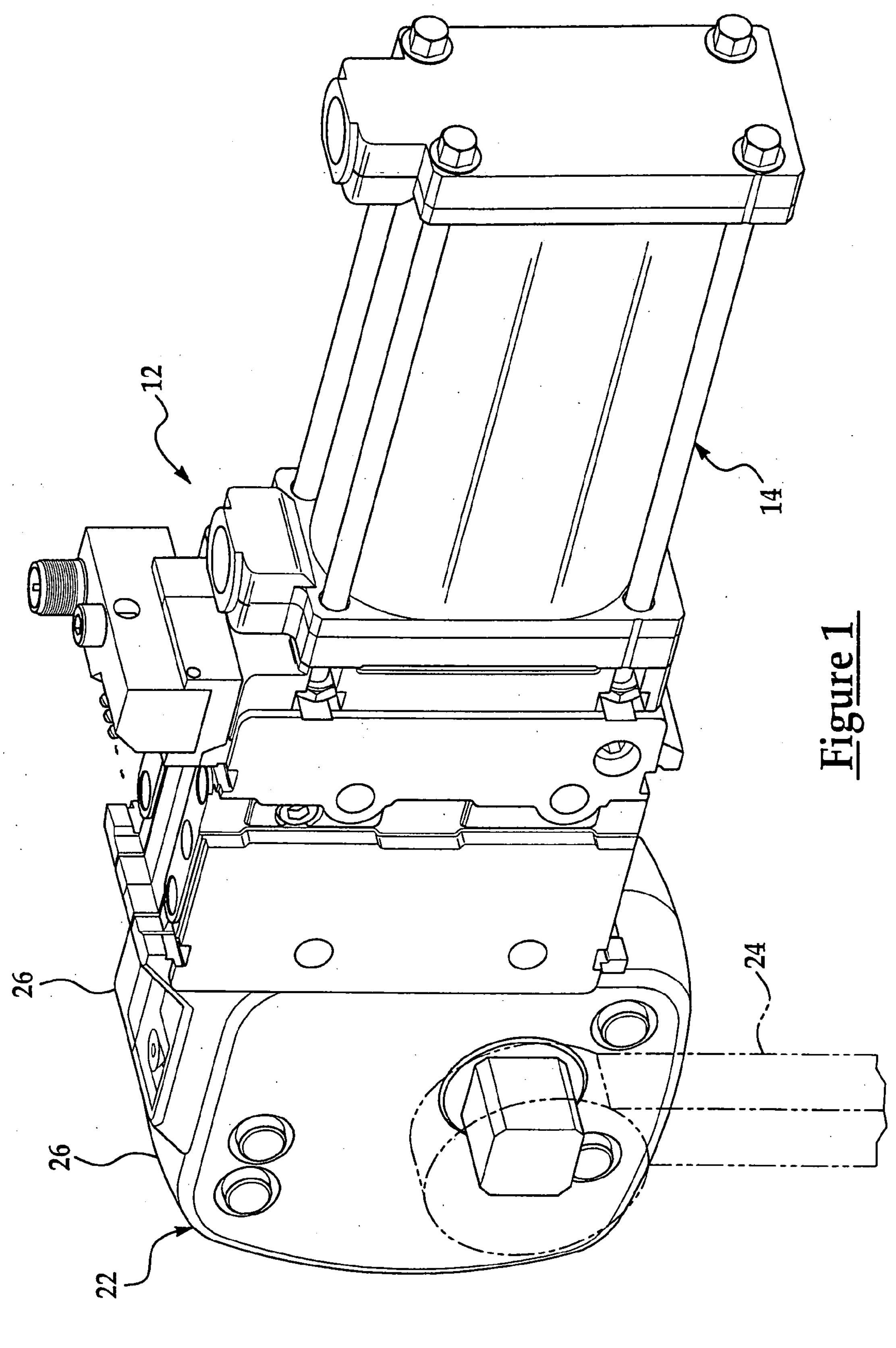
FIG. 1 is an isometric view showing a power clamp of the present invention.
Figure 2:
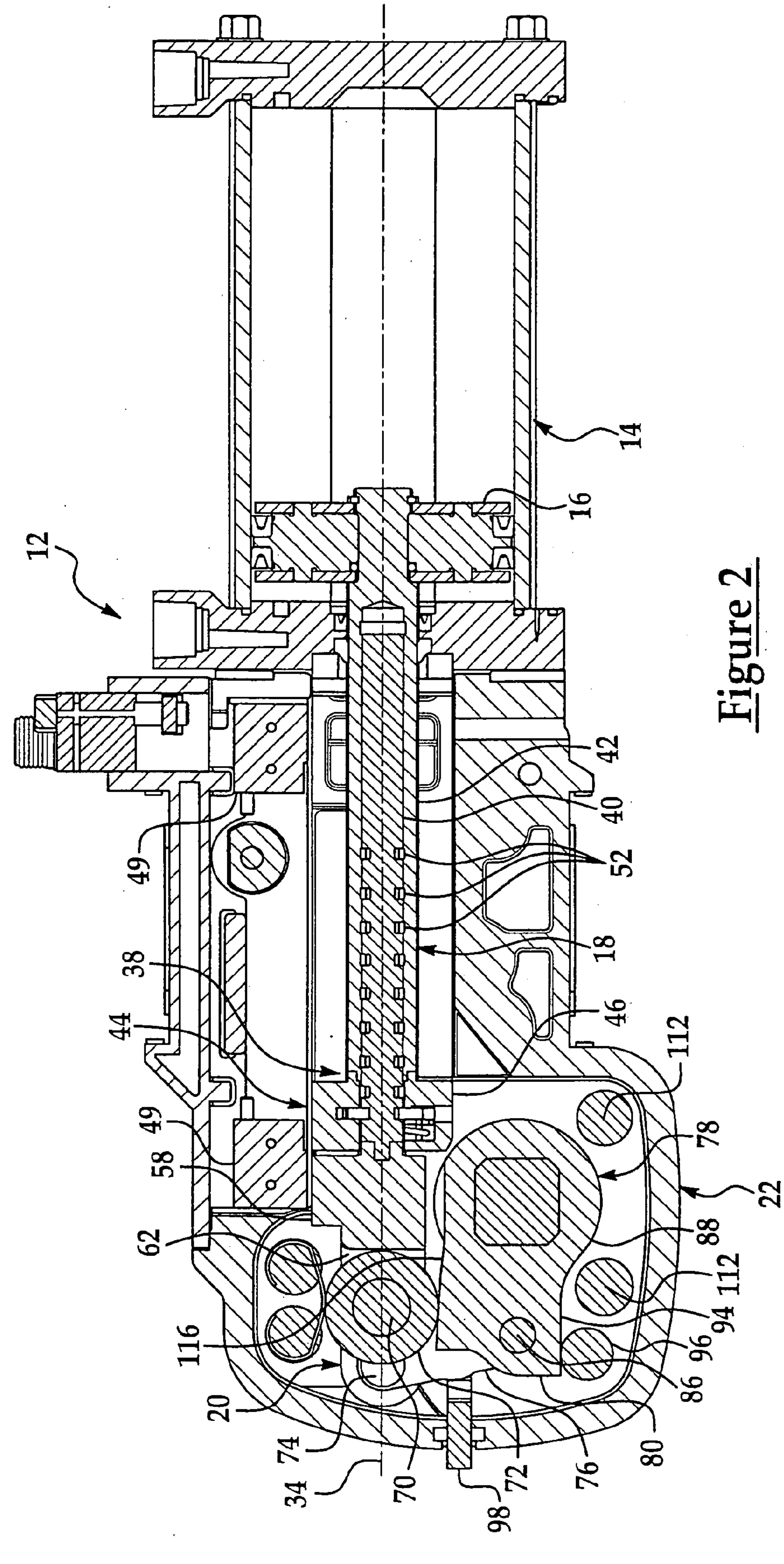
FIG. 2 is a sectional view of the power clamp of the present invention.
Figure 3:
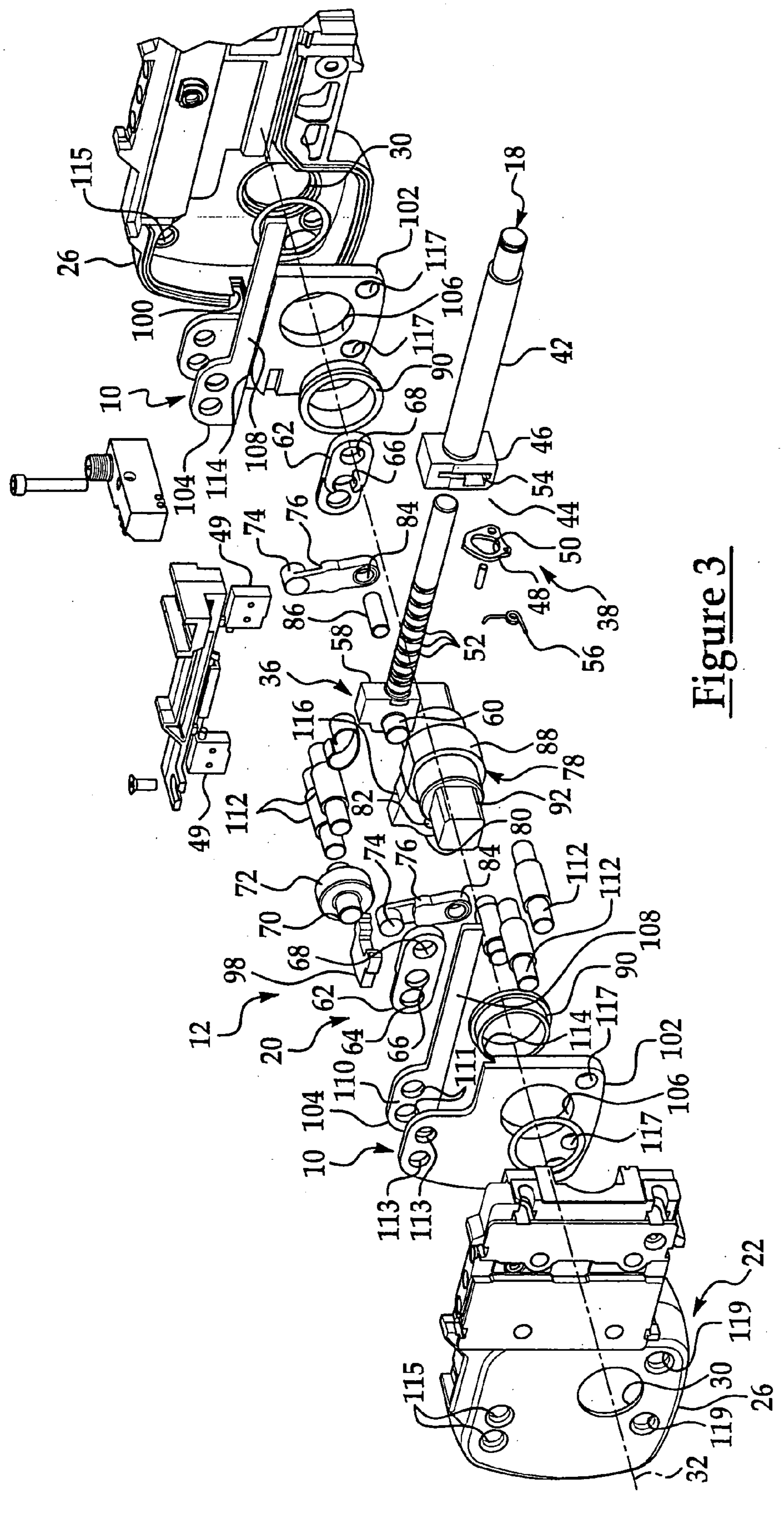
FIG. 3 is an exploded view showing a plate and beam structure of a power clamp of the present invention.

FIGS. 1–3 illustrate a plate and beam structure 10 of a power clamp 12 as defined by the present invention. The power clamp 12 is actuated by a fluid cylinder or linear actuator 14, preferably pneumatic or hydraulic. The linear actuator 14 includes a piston 16 attached to the end of a piston rod 18. The linear actuator 14 provides linear reciprocal movement to the piston rod 18 which, in turn, is coupled to a linkage assembly 20 of the power clamp 12. The linkage assembly 20 is disposed within a housing 22 of the power clamp 12 and converts the linear motion of the piston rod 18 into rotary motion of a clamp arm 24 between a clamped position and an unclamped position.

The housing 22 of the power clamp 12 includes two bilateral halves 26 that form an enclosed, hollow portion having the plate and beam structure 10 disposed therein. One end of the housing 22 is connected to the linear actuator 14 and open to receive the free end of the piston rod 18. The plate and beam structure 10, in conjunction with the inner surface of the bilateral halves 26 of the housing 22, form an elongate guide slot 28 for guiding and receiving the piston rod 18. The housing 22 also includes a series of coaxial apertures 30 extending through the bilateral halves 26 of the housing 22 and the power clamp 12. The coaxial apertures 30 have a common axis 32 offset from and perpendicular to a longitudinal axis 34 of the guide slot 28.

To adjust the degree of rotation of the clamp arm 24 without having to disassemble the power clamp 12, an adjustable piston rod assembly 38 provides for telescopic adjustment of the piston rod 18 along a longitudinal axis of the piston rod. The adjustable piston rod assembly 38 will not be discussed in detail here. However, the necessary features of the piston rod assembly 38 for the present invention are that the adjustable piston rod assembly 38 includes a telescopic adjustable piston rod 18 and a rod end 36. The adjustable telescopic piston rod 18 provides a rod 40 telescopically received by a hollow shaft 42. An adjustment mechanism 44 is connected to the end of the hollow shaft 42 and allows for telescopic adjustment of the rod 40 within the hollow shaft 42. The adjustment mechanism 44 provides a small housing or block 46 for housing a spring-biased cam 48. The cam 48 includes a through aperture 50 for receiving rod 40. The aperture 50 is substantially oval wherein the aperture 50 has a smaller opening at one end of the aperture 50 and a larger opening at the opposite end of the aperture 50. A plurality of cylindrical recesses 52 are formed on the outside surface of rod 40 for receiving a portion of the cam 48 that defines the smaller opening of the aperture 50 in the cam 48. The housing 46 of the adjustment mechanism 44 is accessed from outside the housing 22 of the power clamp 12 through an aperture 54 provided in the housing 46 of the adjustment mechanism 44. The cam 48 is pushed against the bias of a spring 56 to allow rod 40 to pass through the larger opening of aperture 50. The rod 40 can then be telescopically moved relative to the hollow shaft 42. When the cam 48 is released, the portion of the cam 48 that defines the smaller portion of aperture 50 engages one of the cylindrical recesses 52 of rod 40 to lock the telescopic piston rod 40 into a fixed position with respect to the hollow shaft 42 providing an adjustable length piston rod 18.

To connect the piston rod 18 to the linkage assembly 20, the rod end 36 is connected to the end of rod 40 of the telescopic piston rod 18. The rod end 36 provides a block structure 58 with a pin 60 that extends outwardly from the lateral sides of the block structure 58. The block structure 58 has a flat top surface positionable to be sensed by a pair of proximity switches 49. The proximity switches 49 send a signal to a controller to electronically identify when the power clamp 12 is in the clamped or unclamped position by determining the position of the block structure 58. The ends of pin 60 are pivotally received by a pair of opposing, substantially parallel, oval linkage members 62. The linkage members 62 have three corresponding apertures 64, 66, 68 wherein the first aperture 64 receives pin 60 extending therethrough while the ends of the pin 60 are received by and slide along the elongate guide slot 28.

The second apertures 66 in linkage members 62 pivotally receive a pin 70 mounted within a roller 72. The roller 72 provides an aperture for receiving pin 70 such that pin 70 is coaxially mounted with the center line axis of roller 72. The second aperture 66 of the linkage member 62 can be substantially oblong or oval so that when the roller 72 engages the linkage assembly 20, as will be described in detail later, the pin 70 can move within the second aperture 66, thus allowing the roller 72 to move relative to the linkage member 62. Pin 70 is received by and driven along the elongate guide slot 28.

The third aperture 68 of linkage members 62 pivotally receives an integral post 74 extending from a pair of opposing, substantially oval links 76. Each post 74 is substantially cylindrical and extends outward from one end of the links 76. At the opposite end of links 76, the links 76 are pivotally connected to a shaft link 78. The shaft link 78 includes a lever arm 80 having an aperture 82 extending therethrough. The links 76 provide apertures 84 that are coaxially aligned with the through aperture 82 provided in the lever arm 80 of the shaft link 78. A pin 86 is inserted through the coaxial apertures 84 and the through aperture 82 in the lever arm 80 such that the links 76 are pivotally mounted on opposite sides of the lever arm 80.

The shaft link 78 also includes a pivot pin 88 integrally connected to the lever arm 80. The pivot pin 88 is substantially cylindrical and is rotatably disposed within the coaxial apertures 30 provided in the housing 22. A pair of bushings 90 are seated within the coaxial apertures 30 to act as a bearing surface for pivot pin 88. A substantially rectangular portion 92 of the pivot pin 88 extends through the coaxial apertures 30 and away from the housing 22 so as to allow the clamp arm 24 to be mounted thereto.

To stop the clamp arm 24 in a predetermined position, the shaft link 78 provides a positive stop 94 integral with and extending from the lever arm 80. The positive stop 94 engages a post 96 secured between the interior walls of the housing 18. The positive stop 94 engages the post 96 to limit the travel of the clamp arm 24 in the clamped position.

Even though the power clamp 12 is designed not to open unexpectedly in the event of a loss of power and/or air pressure to the linear actuator 14, it may be desirable to move the power clamp 12 to the unclamped position in order to release a workpiece (not shown) or reset the linkage assembly 20 in the absence of power or air pressure. Due to the position of the linkage assembly 20 when in a clamped position, the actuation force can be too great to manually move the power clamp 12 to the unclamped position without disassembling the power clamp 12 or the linear actuator 14. The present invention provides a reciprocal member 98 slidably disposed within a slot 100 provided in the end wall of the housing 22. The reciprocal member 98 has a substantially rectangular body with a pair of larger end portions extending within the housing 22 and beyond the length of the slot 100 so as to capture the reciprocal member 98 within the end wall of the housing 22. The reciprocal member 98 is aligned with the mid portion of links 76 so that the reciprocal member 98 is displaced by the links 76 when the power clamp 12 is in the clamped position. If power and/or air pressure is lost to the power clamp 12 when in the clamped position, the reciprocal member 98 can be manually manipulated to move the linkage assembly 20 toward the unclamped position.

In order to support the mounting and clamping forces of the linkage assembly 20 of the power clamp 12, the present invention provides the plate and beam structure 10 disposed within the housing 22 of the power clamp 12. The internal plate and beam structure 10 allows the bilateral halves 26 of the housing 22 to be fabricated from a lightweight, inexpensive material, such as cast aluminum. The accuracy in fabricating the bilateral halves 26 of the housing 22 will determine whether portions of the housing 22 need to be machined. Although it is possible to cast all of the features into the bilateral halves 26 of the housing 22, it may be necessary to machine the coaxial apertures 30 and the other detailed features.

The plate and beam structure 10 of the present invention includes a pair of opposing plate members 102 and a pair of opposing beam members 104. Each of the plates 102 lies against the inner front and rear walls of the housing 22, and the perimeter of the plates 102 complement the inner perimeter of the walls of the housing 22. Each plate 102 provides an aperture 106 coaxially aligned with the coaxial apertures 30 in the housing 22. The bushings 90 are seated within the apertures 106 in the plates 102 to support the rotation of the pivot pin 88. Since the housing 22 is fabricated from a lightweight material, the plates 102 are fabricated from a high strength steel to support the mounting and clamping forces applied to the plates 102 by the pivot pin 80.

The pair of opposing beams 104 lie between the opposing plates 102. The beams 104 provide a long substantially rectangular rail section 108 with an integral, outwardly extending portion 110 at the end of the beam 104. The integrally extending portion 110 includes a pair of apertures 111 coaxially aligned with a pair of apertures 117 provided in the plates 102 and coaxially aligned with apertures 115 provided in the bilateral halves 26 of the housing 22. Another pair of apertures 117 are also provided in the bottom of plates 102. These apertures 117 also correspond to a pair of apertures 119 in the housing 22. Dowel pins 112 are press-fit through these corresponding coaxial apertures 111, 113, 115 and through coaxial apertures 117, 119 to secure the plates 102, beams 104, and housing 22 together. The plates 102 and beams 104 work together to form the elongate guide slot. The plates 102 provide shoulders 114 to define the bottom portion of the guide slot. The bottom surface of the rail section 108 of the beams 104 oppose the shoulders 114 of the plates 102 and act to define the top of the elongate guide slot. The guide slot provides guidance to pins 60 and 70. The beams 104 are also fabricated from a high strength steel to support the actuation and clamping forces of the linkage assembly 20.

In operation, the power clamp 12 starts in the unclamped position with the piston rod 18 fully retracted in the linear actuator 14. When the linear actuator 14 is actuated, the piston rod 18 extends into the housing of the power clamp 12 and drives the pins 60, 70 along the elongate guide slot of the housing 22. The linkage assembly 20 converts the linear actuator motion of the piston rod 18 into rotary motion of the clamp arm 24 toward the clamped position. Just prior to or simultaneous with the lever arm 80 rotating and engaging the post 96, the roller 70 engages and rolls on a tapered landing 116 of the lever arm 80 and begins to drive pins 60 and 70 upward into beams 104 creating a wedging effect with the roller 72. The linkage assembly 20 moves to an over-center position without risking the wear of the linkage assembly of the power clamp 12 by effectively wedging the linkage assembly 20 into the clamped position. This occurs by having the pin 70 of the roller 72 wedge against the beam 104 as the roller 70 rolls on the tapered landing 116 provided on the lever arm 80 of the shaft link 78. The tapered landing 116 acts as a ramp for the roller 72 to engage and roll onto when the power clamp 12 is moving to the clamped position. By providing the tapered landing 116 of the lever arm 80, the roller 72 increasingly provides force on pins 60 and 70 against beam 104 as little or no force is applied to link 76. This assures that the clamp arm 24 is tightly secured in the clamped position while also assuring that no excessive wear is occurring to the linkage assembly 20. The power clamp 12 moves to the unclamped position by essentially reversing the steps as described above.

Figure 4:
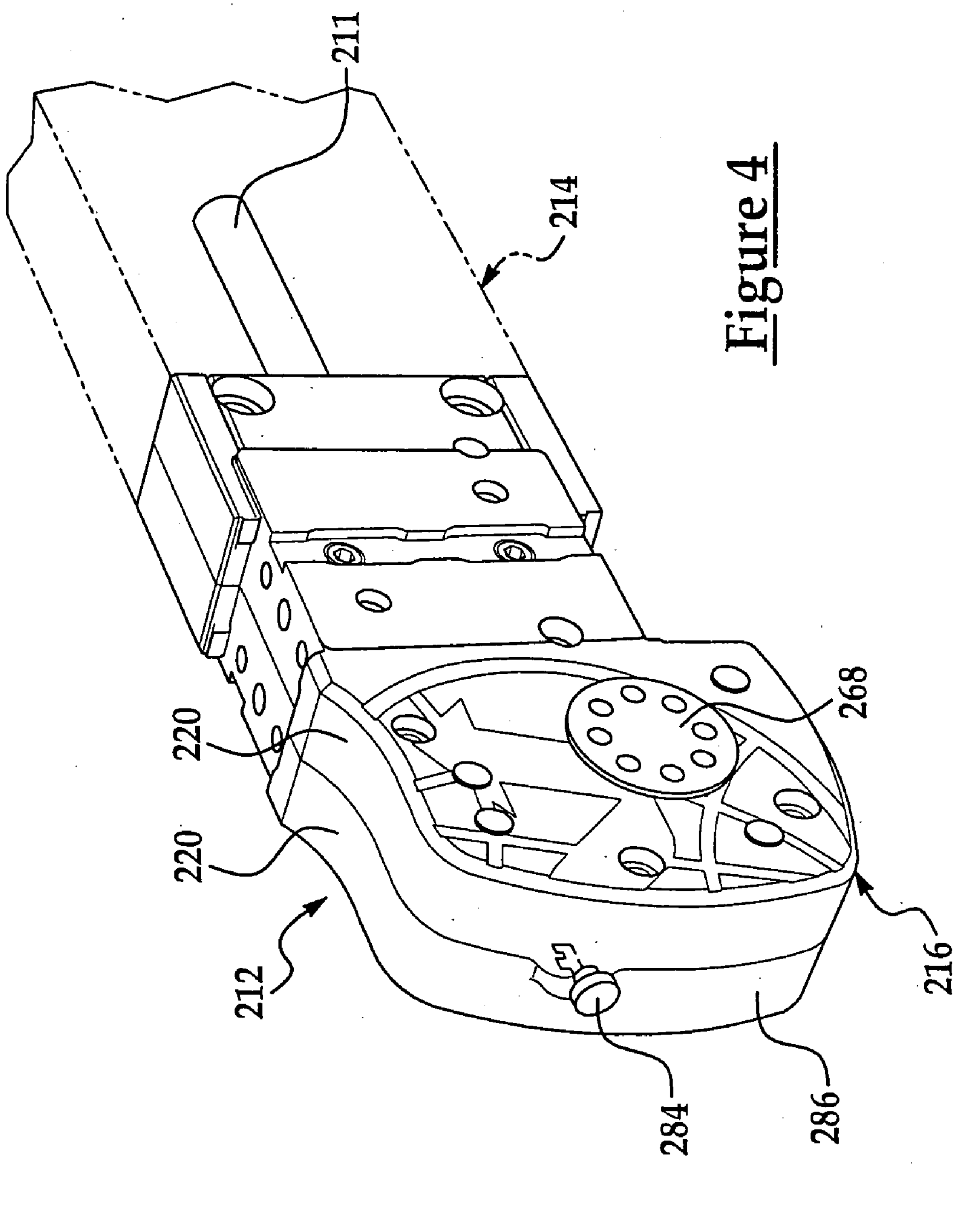
FIG. 4 is an isometric view showing a second power clamp as taught by the present invention.
Figure 5:
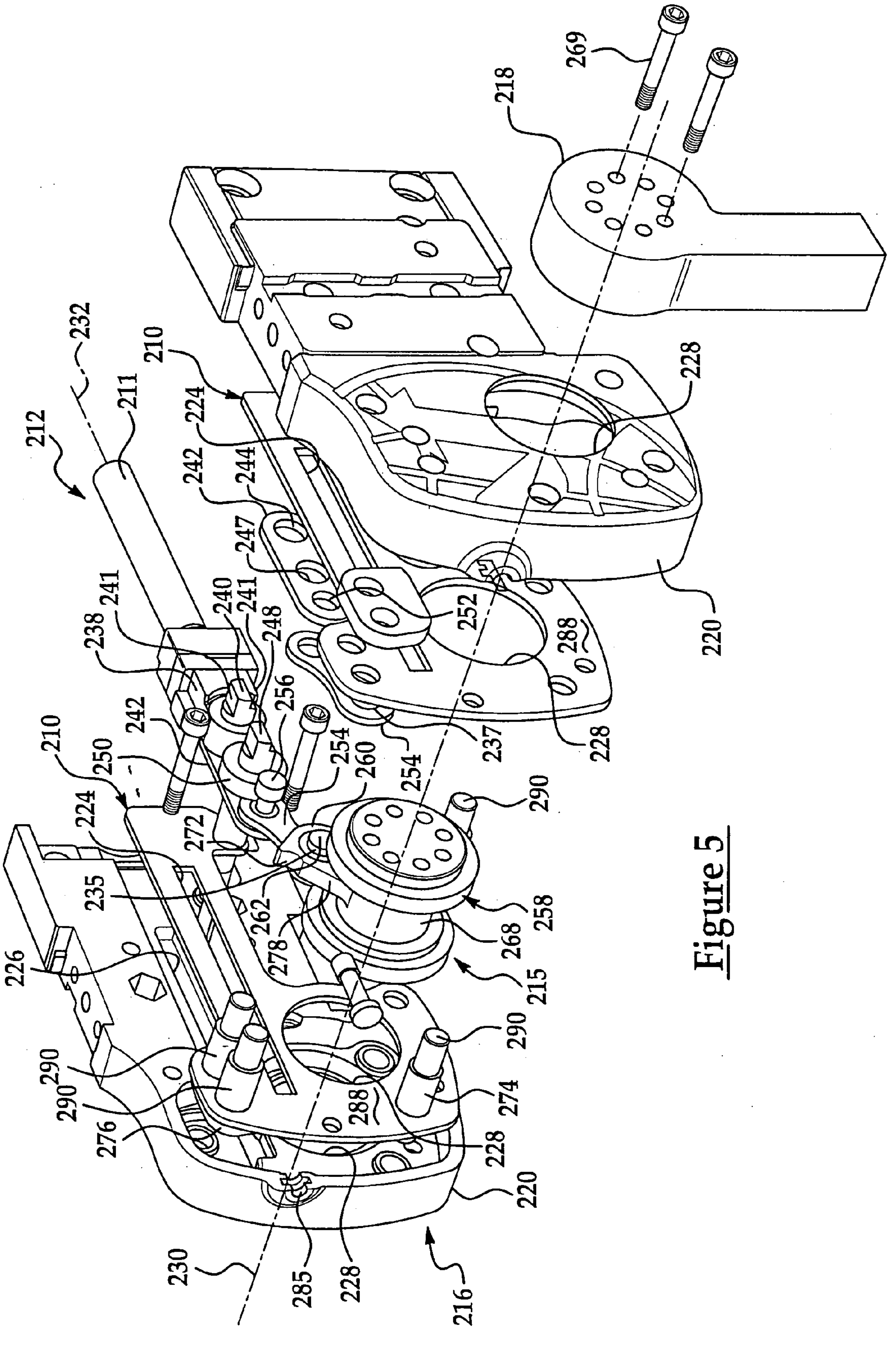
FIG. 5 is an exploded view showing a laminated plate structure of the second power clamp taught by the present invention.
Figure 6:
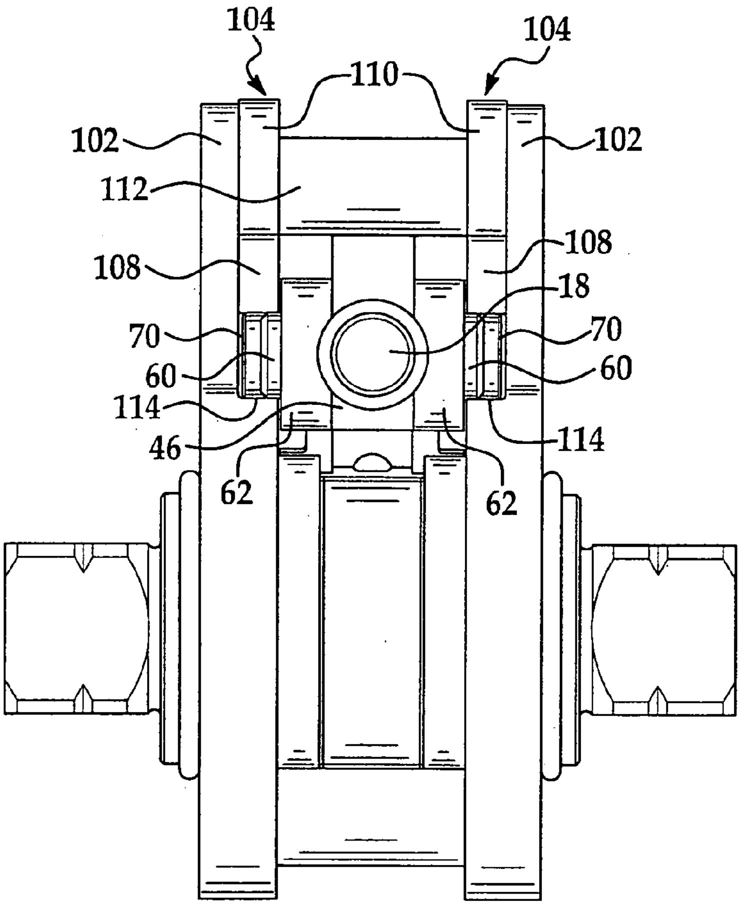
FIG. 6 is a cross-sectional view of the plate and beam structure taught by the present invention.
Figure 7:
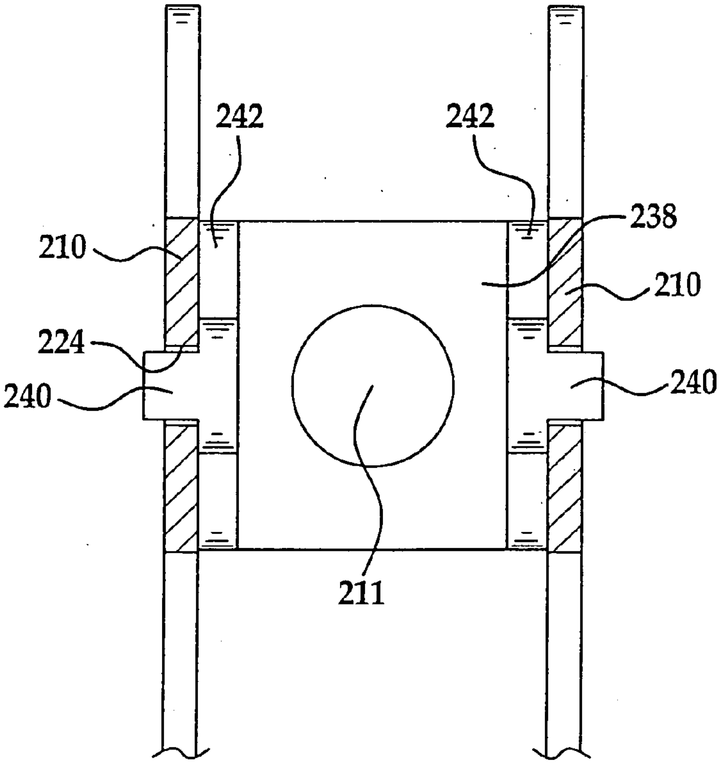
FIG. 7 is a cross-sectional view of the laminated plate structure taught by the present invention.

FIGS. 4 and 5 illustrate a laminated plate structure 210 as defined by the present invention. The laminated plate structure 210 is used within a power clamp 212 and is actuated by means of a fluid cylinder or linear actuator 214. The linear actuator provides a piston (not shown) attached to an end of a piston rod 211. The fluid cylinder or linear actuator 214 is preferably pneumatic or hydraulic. The linear actuator 214 provides linear reciprocating movement to the piston rod 211 which, in turn, is coupled to a linkage assembly 215 of the power clamp 212. The linkage assembly 215 is disposed within a housing 216 of the power clamp 212 and converts the linear motion of the piston rod 211 into rotary motion of a clamp arm 218. The reciprocal linear movement of the linear actuator 214 and piston rod 211 correspond to reciprocal rotary movement of the clamp arm 218 between a clamped position and an unclamped position.

The housing of the power clamp 212 is formed by two bilateral halves 220 that form an enclosed, hollow portion having the laminated plate structure 210 disposed therein. One end of the housing 216, is connected to the linear actuator 214 and is open to receive the free end of the piston rod 211. The laminated plate structure 210 provides an elongate guide slot 224 aligned with an elongate guide slot 226 formed in the inner surface of the two halves 220 of the housing 216. The housing 216 also includes a series of coaxial apertures 228 extending through the two halves 220 of the housing 216 and the laminated plate structure 210 of the present invention. The coaxial apertures 228 have a common axis 230 offset from and perpendicular to a longitudinal axis 232 of the guide slots 224, 226.

To connect the piston rod 211 to the linkage assembly 215, a rod end 238 having a U-shaped block structure threadingly engages and receives a stem-like portion of the free end of the piston rod 211. A pin 240 extends through an aperture provided in the rounded end of the U-shaped portion of the rod end 238. Each end of the pin 240 has substantially flat parallel landings 241 that engage the elongate guide slots 224, 226 of the housing 216 and the laminated plate structure 210, respectively. The pin 240 is pivotally connected to a pair of substantially parallel linkage members 242 wherein each linkage member 242 has apertures 244 extending therethrough for receiving the pin 240. The apertures 244 can also be elongated (shown in hidden lines) to allow for movement of the pin 240 within aperture 244 during movement of the power clamp 212 between the clamped and unclamped positions. The linkage members 242 also provide a second aperture 247 extending therethrough for receiving a second pin 248 similar to pin 240. Pin 248 is received by an aperture extending through a substantially circular rubber roller 250 disposed between the linkage members 242. The flattened landings of the pin 248 similarly engage the elongated slots 224, 226 of the housing 216 and laminated plate structure 210 as described for pin 240.

The linkage assembly 215 is further defined by linkage members 242 being pivotally connected to a pair of links 254 by pin 256 extending through corresponding apertures 252 provided in the linkage members 242 and one of the links 254. At the opposite end of links 254, the links 254 are pivotally connected to a shaft link 258. The shaft link 258 includes a lever arm 260 having an aperture 235 extending therethrough. A pin 262 is inserted through aligned aperture 257 provided in the link 254 and the aperture 235 provided in the lever arm 260 of the shaft link 258.

The shaft link 258 also provides a pivot pin 268 integrally connected to the lever arm 260. The pivot pin 268 is substantially cylindrical and is rotatably disposed within the coaxial apertures 228 provided in the housing 216 and the laminated plate structure 210. The clamp arm 218 is connected to an exposed portion of the pivot pin 268 by fasteners 269. The shaft link 258 also provides a positive stop 272 integrally formed in the lever arm 260. The positive stop 272 provides an arcuate surface formed therein to complement and receive the substantially circular shape of a rigid post 274. Positive stop 272 abuts the post 274 to limit the travel of the clamp arm 218 in the clamped position. The power clamp 212 uses the rod end 238, the linkage assembly 215, and the shaft link 258 to transform reciprocal movement of the piston rod 211 into rotary movement of the clamp arm 218 between the clamped position and the unclamped position.

Even though the power clamp 212 is designed not to open unexpectedly in the event of a loss of power and/or air pressure to the linear actuator 214, it may be desirable to move the power clamp 212 to the unclamped position in order to release the workpiece (not shown) or reset the linkage assembly 215 in the absence of power and/or air pressure. To accomplish this, a reciprocal member 284 is slidably disposed within an aperture 285 provided within an end wall 286 of the housing 216. The reciprocal member 284 has a cylindrical body with a pair of larger cylindrical end portions integral with the body of the reciprocal member 284. The larger end portions capture the reciprocal member 284 within the end wall of the housing 216. Reciprocal member 284 is aligned with longitudinal axis 232 of the piston rod 211 so that the reciprocal member 284 is displaced by the linkage assembly 215 when the power clamp 212 moves into the clamped position. If power or air pressure is lost to the power clamp 212 when in the clamped position, the reciprocal member 284 can be manually impacted to move the linkage assembly 215 toward the unclamped position.

To allow the linkage assembly 215 to move to an over-center position without risking wear of the internal mechanism of the power clamp 212, a wedging assembly effectively wedges the linkage assembly 215 into the clamped position. This is accomplished by mounting two wear blocks 276 on the outside of the laminated plate structure 210 just above the guide slots 224. Wear blocks 276 engage the flat landing areas provided on pins 248, 240 when the power clamp 212 moves into the clamped position. Further upward pressure is applied to the pins 248, 240 against the wear blocks 276 by having the roller 250 roll on a tapered landing 278 provided on the lever arm 260 of the shaft link 258. The tapered landing 278 acts as a ramp for the roller 250 to engage and roll onto when the power clamp 212 is moving into the clamped position. By providing the tapered landing 278 on the lever arm 260, the roller 250 increasingly provides force on pins 248, 240 against the wear block 276 as the roller 250 rolls upward along the tapered landing 278 while little or no force is applied to links 254. This assures that the clamp arm 218 is tightly secured when in the clamped position while also assuring that excessive wear is not occurring to the linkage assembly 215.

In order to provide a lightweight, high strength housing 216 for the power clamp 212, the two halves 220 of the housing 216 are fabricated from a lightweight material, such as cast aluminum. The accuracy in which the two halves 220 of the housing 216 can be fabricated will determine whether portions of the housing 216 need to be machined. Although it is possible to cast all the features into the two halves 220 of the housing 216, it may be necessary to machine the apertures 228 and the guide slot 226. The laminated plate structure 210 provides a pair of substantially parallel planar plates 288 housed within the two halves 220 of the housing 216. Each of the planar plates 288 has substantially the same thickness and contoured perimeter, and preferably are identical to one another. The contoured perimeter of the planar plates 288 is received by and complements a similar contoured shape formed in the interior of the two halves 220 of the housing 216. Each of the planar plates 288 is fabricated from a high strength hardened steel to support the mounting and clamping forces of the linkage assembly 215.

The planar plates 288 are secured to the two halves 220 of the housing 216 by a plurality of dowel pins 290 press-fit into the housing 216 and the planar plates 288. The planar plates 288 also include coaxial apertures 228 for receiving the pivot pin 268 of the shaft link 258 as well as the guide slots 224 for receiving the pins 240, 248 of the linkage assembly 215. When the linear actuator 214 drives the pins 240, 248 along the guide slot 224 and the pins 240, 248 wedge against the wear blocks 276 caused by the roller 250 rolling on the tapered landing 278 of the lever arm 260, the planar plates 288 provide sufficient strength to support the forces applied to pins 240, 248 when the linkage assembly 215 moves to and from the clamped position. In addition, by having the pivot pin 268 disposed within the coaxial aperture 228 of the planar plates 288, the planar plates 288 support the pivot pin 268 when the clamp arm 218 moves to the clamped position. By supporting the mounting and clamping forces of the linkage assembly 215, the high strength laminated plate structure 210 allows the two halves 220 of the housing 216 to be fabricated from a lightweight and inexpensive material.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claim. The scope is to be accorded the broadest interpretation so as to encompass all such modifications and equivalent structures as is permitted under law.

What is claimed is:

1. An enclosed power clamp having a linear actuator and a clamp arm comprising:

housing means having at least two high-strength planar plates spaced from one another enclosed within two lower-strength members, the at least two high-strength planar plates for defining an enclosed path including an elongate guide slot, and a pair of coaxial apertures extending perpendicular to and offset from said elongate guide slot;

internal means operably engageable with said elongate guide slot within said housing means for moving along said enclosed path between first and second end limits of travel; and means for securing said plates together to form a unitary structure.

2. The clamp of claim 1 further comprising:

the at least two high-strength planar plates including at least two replaceable wear blocks for operably engaging the internal means when in one of the first and second end limits of travel.

3. The clamp of claim 1 further comprising:

the at least two high-strength planar plates formed of steel; and the two lower-strength members formed of aluminum.

4. The clamp of claim 1 further comprising:

the at least two high-strength planar plates each including a plate portion and a beam portion operably engaged with respect to each other, the plate portion having a top surface and the beam portion having a bottom surface, the elongate guide slot formed at least in part by the top surface of the plate portion and the bottom surface of the beam portion.

5. The clamp of claim 1 further comprising:

the elongate guide slot forming a closed loop.

6. The clamp of claim 1 further comprising:

the internal means including at least one pin slidingly engageable with the elongate guide slot.

7. The clamp of claim 1 further comprising:

the internal means including means for rotating said clamping arm of the enclosed power clamp.

8. The clamp of claim 1 further comprising:

the securing means including at least one pin engageable with the at least two high-strength planar plates and the two lower-strength members.

9. A method for manufacturing an enclosed power clamp having a linear actuator and a clamp arm comprising the steps of:

assembling at least two high-strength planar plates spaced from one another enclosed within two lower-strength members to form housing means, the at least two high-strength planar plates for defining an enclosed path including an elongate guide slot, and a pair of coaxial apertures extending perpendicular to and offset from said elongate guide slot;

operably engaging internal means with said elongate slot within said housing means for moving along said enclosed path between first and second end limits of travel; and securing said housing means together to form a unitary structure.

10. The method of claim 9 further comprising the step of:

accommodating wear when the internal means is in one of the first and second end limits of travel, wherein the at least two high-strength planar plates include at least two replaceable wear blocks for operably engaging the internal means.

11. The method of claim 9 further comprising the step of:

operably engaging a clamping pin with the pair of coaxial apertures, the clamping pin engageable with said clamp arm external to the housing means.

12. The method of claim 9 wherein the assembling step further comprises the step of:

engaging a plate portion having a top surface to a beam portion having a bottom surface to form at least one of the high-strength planar plates, the top surface and bottom surface defining at least part of the elongate slot.

13. The method of claim 9 wherein the engaging step further comprises the step of:

mounting linkage means with respect to the elongate guide slot and disposed between the at least two high-strength planar plates, the linkage means operable to engage said clamp arm of the enclosed power clamp.

14. An enclosed power clamp having a linear actuator and a clamp arm manufactured according to the method of claim 9 comprising:

housing means having at least two high-strength planar plates spaced from one another enclosed within two lower-strength members, the at least two high-strength planar plates for defining an enclosed path including an elongate guide slot, and a pair of coaxial apertures extending perpendicular to and offset from said elongate guide slot;

internal means operably engageable with said elongate guide slot within said housing means for moving along said enclosed path between first and second end limits of travel; and means for securing said housing means together to form a unitary structure.

15. The clamp of claim 14 further comprising:

the at least two high-strength planar plates including at least two replaceable wear blocks for operably engaging the internal means when in one of the first and second end limits of travel.

16. The clamp of claim 14 further comprising:

the at least two high-strength planar plates each including a plate portion and a beam portion operably engaged with respect to each other, the plate portion having a top surface and the beam portion having a bottom surface, the elongate guide slot formed at least in part by the top surface of the plate portion and the bottom surface of the beam portion.

17. The clamp of claim 14 further comprising:

the elongate guide slot forming a closed loop.

18. The clamp of claim 14 further comprising:

the securing means including at least one pin engageable with the at least two high-strength planar plates and the two lower-strength members.

19. An improved enclosed power clamp having a housing enclosing a slide block connectible to a prime mover for driving the slide block in movement between first and second end limits of travel along an elongate guide slot formed in the housing, link means connected to the slide block at one end and a pivot pin at another end for converting linear movement of the slide block into rotational movement of the pivot pin, the pivot pin rotatably supported in the housing and connectible to a clamp arm for driving the clamp arm between a clamped position and a released position, the improvement comprising:

said housing formed of at least two high-strength planar plates spaced from one another and enclosed within two low-strength members, wherein the at least two high-strength planar plates define an enclosed path for receiving said slide block, each plate having first and second major opposite parallel side surfaces spaced from one another with at least one transverse edge surface extending between said first and second side surfaces defining an outer perimeter of each plate, each of said two planar plates having at least one transverse surface substantially perpendicular to at least one of said first and second side surfaces to form at least a portion of said elongate guide slot; and means for securing said plates to one another to form a unitary structure.

20. The improved clamp of claim 19 further comprising:

the at least two high-strength planar plates including at least two replaceable wear blocks for operably engaging the internal means when in one of the first and second end limits of travel.

* * * * *